2,864,808
TERPOLYMER SYSTEM

Alva F. Harris, Wilbraham, Mass., assignor to Monsanto Chemical Company, St. Louis, Mo., a corporation of Delaware No Drawing. Application December 15, 1954
Serial No. 475,585

1 Claim. (Cl. 260—78.5)

This invention relates to new terpolymers. More particular the invention relates to water-soluble terpolymers of vinyl acetate, maleic anhydride and styrene.

Copolymers of vinyl acetate and maleic anhydride are water-soluble materials that have found considerable use as textile sizing agents. One drawback to their extended use is that the copolymers are heterogeneous due to the separation of a gel phase during the polymerization process. As a result it is difficult to obtain a uniform size on textiles and it is also difficult to duplicate results from batch to batch.

One object of this invention is to provide new water-soluble terpolymers.

A further object is to modify vinyl acetate maleic anhydride copolymers to prevent gel separation during the polymerization process.

These and other objects are attained by polymerizing vinyl acetate with maleic anhydride and styrene or an alkyl or a chloro styrene.

The following examples are given in illustration and are not intended as limitations on the scope of this invention. Where parts are mentioned they are parts by weight.

Example I

Mix together about 49.5 mol percent of vinyl acetate, about 48.5 mol percent of maleic anhydride and about 2 mol percent of styrene with 0.1 part of benzoyl peroxide, 0.3 part of tertiary butyl perbenzoate and 0.06 part of beta nitro styrene. Heat the mixture at 50–70° C. until polymerization starts, then lower the temperature about 10° C., i. e. to about 40–60° C. and maintain the reaction mixture at the reduced temperature with agitation for about 20 hours. At the end of this time, the reaction mixture is too viscous to stir but no gel phase is discernable. Then increase the temperature gradually to 100–105° C. over a period of about 36 hours. The product is a hard clear water-soluble terpolymer having a viscosity of from 10–12 centipoises in a 5% aqueous solution at 25° C. Aqueous solutions of the product are smooth and show substantially no evidence of heterogeneity. When used as textile sizing materials, a uniform size is obtained which does not stick on the drying cans in the sizing operation nor shed in the weaving operation.

Example II

Mix together about 49.5 mol percent of vinyl acetate, about 48.5 mol percent of maleic anhydride and about 2 mol percent of styrene with 0.3 part of tertiary butyl perbenzoate and 0.05 part of di-tertiary butyl peroxide. Heat the mixture at 50–70° C. to initiate polymerization and then reduce the temperature about 10° C. and continue the polymerization reaction at the reduced temperature with agitation until the reaction medium is too viscous to stir, i. e. about 20 hours. Then raise the temperature gradually to about 100–105° C. over a period of 30–36 hours. The product is similar to that of Example I except that the viscosity is from 30–35 centipoises in a 5% aqueous solution at 25° C. No gel separation is observed during the polymerization reaction and the product is homogeneous.

The terpolymers of this invention consist of vinyl acetate and maleic anhydride in the mol percent ratio of 52–48 to 50–50 and styrene or a styrene derivative in the mol percent ratio of 1.8–4.0 based on the final product.

The styrene of the examples may be replaced by alpha alkyl styrenes such as alpha methyl, alpha propyl, etc. styrenes, alpha chloro styrene, alpha para dimethyl styrene, the mono- and di-ring substituted alkyl and chloro styrenes wherein the alkyl group contains 1–4 carbon atoms. Mixtures of styrene and the substituted styrenes may be used but the amount used is so small that it is preferred to use only one styrene component.

The terpolymers are best prepared by mass polymerization but they may be prepared in an organic solvent medium which is inert to the reaction and which is a solvent for the monomers but not for the polymers. The mass polymerization is preferably initiated at 50–70° C. followed by a 10° C. reduction in temperature to 40–60° C. at which temperature the reaction is maintained preferably with constant agitation for about 15–25 hours or until the reaction medium is too viscous to stir. The temperature of the reaction medium is then raised gradually to about 100—120° C. over a period of about 30–40 hours. It is advantageous to hold the reaction medium at the raised temperature for at least an hour to finish off the reaction.

The catalysts which may be used in this reaction are free radical producing materials and particularly peroxy compounds such as peroxides, persalts, hydroperoxides, etc. Other free radical producing catalysts such as various azo compounds may be used. Frequently it is desirable to use a combination of two or more catalysts. The amount of total catalyst should range from 0.1–0.5 part per 100 parts of monomer.

The products of this invention are water-soluble clear resins which have a viscosity ranging from about 7 to about 100 centipoises in 5% aqueous solutions at 25° C. Viscosity control is achieved in part by regulation of the polymerization temperatures and the amount of catalyst but more conveniently by the addition of polymerization regulators such as the beta nitro styrene of Example I or various mercaptans or other well known modifiers.

Aqueous solutions of this invention are particularly useful as sizes for textiles and especially for nylon yarns to give an efficient non-tacky abrasion resistant size that can be easily removed in scouring operations after the sized yarns are woven.

What is claimed is:

A process for preparing a water-soluble terpolymer of vinyl acetate, maleic anhydride and a styrene component by a mass polymerization process which comprises mixing the three monomeric components with a free radical producing catalyst, heating the mixture en masse at 50–70° C. to initiate polymerization, reducing the temperature of the mixture about 10° C. to the range of 40–60° C. and maintaining the mixture at said temperature for about 15–25 hours and then gradually raising the temperature to 100–120° C. for a period of 30–40 hours; said styrene component being selected from the group consisting of styrene, alpha alkylstyrenes, alpha chlorostyrenes, alpha methyl-paramethylstyrene, the ring-substituted mono-and di-alkyl and chlorostyrenes and mixtures thereof, said alkyl groups containing 1–4 carbon atoms, the monomer mixture employed being such that the mol percent ratio of vinyl acetate to maleic anhydride varies from 52–48 to 50–50 and the styrene component constitutes 1.8–4.0 mol percent of the mixture.

References Cited in the file of this patent

UNITED STATES PATENTS

| | | |
|---|---|---|
| 2,047,398 | Voss et al. | July 14, 1936 |
| 2,519,764 | Jacobson | Aug. 22, 1950 |
| 2,586,477 | Niles | Feb. 19, 1952 |
| 2,616,867 | Rossin | Nov. 4, 1952 |
| 2,640,039 | Williams | May 29, 1953 |

OTHER REFERENCES

Seymour et al.: "Ind. and Eng. Chem.," vol. 41, No. 7, July 1949, pages 1509–1513.